(12) United States Patent
Yu et al.

(10) Patent No.: US 12,742,862 B2
(45) Date of Patent: Sep. 22, 2026

(54) DEPTH CALCULATION METHOD AND SYSTEM BASED ON TIME OF FLIGHT, AND STORAGE MEDIUM

(71) Applicant: ORBBEC INC., Shenzhen (CN)

(72) Inventors: Hongtao Yu, Shenzhen (CN); Minrong Meng, Shenzhen (CN); Tao Gu, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 561 days.

(21) Appl. No.: 18/226,052

(22) Filed: Jul. 25, 2023

(65) Prior Publication Data

US 2023/0366992 A1 Nov. 16, 2023

Related U.S. Application Data

(63) Continuation of application No. PCT/CN2021/107952, filed on Jul. 22, 2021.

(30) Foreign Application Priority Data

May 21, 2021 (CN) ........................ 202110558527.6

(51) Int. Cl.
*G06T 7/521* (2017.01)
*G01S 7/4865* (2020.01)
(Continued)

(52) U.S. Cl.
CPC .......... *G01S 7/4866* (2013.01); *G01S 7/4915* (2013.01); *G01S 17/894* (2020.01); *G06T 7/521* (2017.01);
(Continued)

(58) Field of Classification Search
CPC .... G01S 17/894; G01S 7/4866; G01S 7/4912; G01S 7/4914; G01S 7/4915; G06T 2200/28; G06T 2207/10028; G06T 7/521
See application file for complete search history.

(56) References Cited

U.S. PATENT DOCUMENTS 3,548,642 A 12/1970 Flaherty et al.
10,529,060 B2 1/2020 Kwon et al.
(Continued)

FOREIGN PATENT DOCUMENTS

CN 107798658 A 3/2018
CN 109544617 A 3/2019
(Continued)

OTHER PUBLICATIONS

PCT International Search Report and the Written Opinion mailed Feb. 17, 2022, issued in related International Application No. PCT/CN2021/107952, with partial English translation (9 pages).
(Continued)

*Primary Examiner* — Md N Haque
(74) *Attorney, Agent, or Firm* — Sheppard Mullin Richter & Hampton LLP

(57) ABSTRACT

A time-of-flight depth calculation method includes: obtaining a phase image, and obtaining, based on the phase image, a differential ratio of charge signals corresponding to reflected signals acquired by an image sensor at different times; in response to that the differential ratio of the charge signals is greater than or equal to a threshold, obtaining a first phase based on a phase conversion model and the differential ratio of the charge signals; and calculating a depth value of a target region based on the first phase.

17 Claims, 3 Drawing Sheets

(51) Int. Cl.
*G01S 7/4915* (2020.01)
*G01S 17/894* (2020.01)

(52) U.S. Cl.
CPC .................... *G06T 2200/28* (2013.01); *G06T 2207/10028* (2013.01)

(56) References Cited

U.S. PATENT DOCUMENTS

| | | | | |
|---|---|---|---|---|
| 2014/0002636 | A1* | 1/2014 | Lee | G01C 3/08 348/135 |
| 2015/0092019 | A1* | 4/2015 | Asano | G01C 3/085 348/136 |
| 2015/0193938 | A1 | 7/2015 | Freedman et al. | |
| 2015/0334372 | A1 | 11/2015 | Kim et al. | |
| 2015/0341573 | A1* | 11/2015 | Matsuo | H04N 25/70 348/135 |
| 2017/0150077 | A1* | 5/2017 | Matsuo | H04N 25/46 |
| 2018/0306926 | A1* | 10/2018 | LaChapelle | G01S 17/87 |
| 2020/0264281 | A1 | 8/2020 | Wei et al. | |
| 2022/0277467 | A1 | 9/2022 | Yang et al. | |

FOREIGN PATENT DOCUMENTS

| | | | |
|---|---|---|---|
| CN | 109889809 | A | 6/2019 |
| CN | 111311615 | A | 6/2020 |
| CN | 111487648 | A | 8/2020 |
| CN | 111580067 | A | 8/2020 |
| CN | 111736173 | A | 10/2020 |

OTHER PUBLICATIONS

First Search dated Jul. 21, 2022, issued in related Chinese Application No. 202110558527.6 (2 pages).

First Office Action dated Jul. 27, 2022, issued in related Chinese Application No. 202110558527.6, with English translation (17 pages).

* cited by examiner

DEPTH CALCULATION METHOD AND SYSTEM BASED ON TIME OF FLIGHT, AND STORAGE MEDIUM

CROSS-REFERENCE TO RELATED APPLICATIONS

This application is a Continuation Application of International Patent Application No. PCT/CN2021/107952 filed on Jul. 22, 2021, which is based on and claims priority to Chinese Patent Application No. 202110558527.6, filed on May 21, 2021. The entire content of all of the above-referenced applications is incorporated herein by reference.

TECHNICAL FIELD

This application relates to the technical field of image processing, and in particular, to a time-of-flight depth calculation method and system, and a storage medium.

BACKGROUND

As TOF (Time-Of-Flight) technologies become mature, a method for obtaining a depth image by the TOF technologies is generally to obtain a plurality of phase images, calculate an inverse trigonometric function of a difference of the plurality of phase images based on the difference, to obtain a real phase, and obtain a depth image based on the phase. However, the inverse trigonometric function is a nonlinear function. Through a table lookup, a closest value can be selected and an iterative algorithm can be matched to obtain a phase value. The calculation process is complex. When this method is used to calculate the phase, a table lookup needs to be performed. The table lookup consumes memory and degrades performance of the system. Moreover, it is impossible to solve a plurality of results through parallel processing, and floating-point number calculation is very time-consuming.

Furthermore, if depth resolution of a depth camera is VGA (a standard VGA display region is 640×480), values of 640×480 inverse trigonometric functions need to be solved, which is very time-consuming, resulting in failing to achieve a high frame rate output. If the product adopts a processor with a strong calculation capability, costs are increased.

SUMMARY

Embodiments of this application provide a time-of-flight depth calculation method and system, and a storage medium, to resolve the problem of low efficiency of depth measurement.

According to a first aspect, an embodiment of this application provides a time-of-flight based depth calculation method, including:

- obtaining a phase image, where the phase image is generated based on reflected signals that are reflected by a target region and acquired by an image sensor in a single frame period;
- obtaining, based on the phase image, a differential ratio of charge signals corresponding to the reflected signals acquired by the image sensor at different times;
- in response to that the differential ratio of the charge signals is greater than or equal to a preset threshold, obtaining a first phase based on a phase conversion model and the differential ratio of the charge signals; and
- calculating a depth value of the target region based on the first phase.

According to a second aspect, an embodiment of this application provides a time-of-flight based depth calculation system, including:

- a signal emitter, configured to emit an infrared beam to a target region;
- an image sensor, including at least one tap, configured to acquire charge signals of reflected signals reflected by the target region at different times, and form a phase image based on the charge signals; and
- a processing module, configured to calculate a depth value of the target region based on the phase image and the time-of-flight based depth calculation method according to the first aspect.

According to a third aspect, an embodiment of this application provides a terminal device, including: a memory, a processor, and a computer program stored in the memory and executable on the processor, where the processor, when executing the computer program, implements the time-of-flight based depth calculation method according to the first aspect.

According to a fourth aspect, an embodiment of this application provides a computer-readable storage medium, storing a computer program, where the computer program, when executed by a processor, implements the time-of-flight based depth calculation method according to the first aspect.

According to a fifth aspect, an embodiment of this application provides a computer program product, where the computer program product, when run on a terminal device, causes the terminal device to perform the time-of-flight based depth calculation method according to the first aspect.

It may be understood that, for beneficial effects of the second aspect to the fifth aspect, reference may be made to related descriptions in the first aspect, which are not described herein again.

Compared with existing technologies, the beneficial effects of the embodiments of this application are as follows: In this application, the phase image is obtained, and the differential ratio of the charge signals corresponding to the reflected signals acquired by the image sensor at different times is obtained based on the phase image; in response to that the differential ratio of the charge signals is greater than or equal to the preset threshold, the first phase is obtained based on the phase conversion model and the differential ratio of the charge signals; and the depth value of the target region is calculated based on the first phase. In this application, when the differential ratio of the charge signals is greater than or equal to the preset threshold, the phase conversion model is adopted to calculate the phase. In this way, the obtained depth value between the target region and the image sensor can be ensured to be more accurate, and the calculation speed is faster.

BRIEF DESCRIPTION OF THE DRAWINGS

To describe the technical solutions of the embodiments of this application more clearly, the following briefly introduces the accompanying drawings required for describing the embodiments or the related art. Apparently, the accompanying drawings in the following description show only some embodiments of this application, and a person of ordinary skill in the art may still derive other drawings according to the accompanying drawings without creative efforts.

DETAILED DESCRIPTION

In the following description, for the purpose of illustration rather than limitation, specific details such as the specific system structure and technology are proposed to thoroughly understand the embodiments of this application. However, a person skilled in the art knows that this application may be implemented in other embodiments without these specific details. In other cases, detailed descriptions of well-known systems, apparatuses, circuits, and methods are omitted to avoid unnecessary details hindering the description of this application.

It is to be understood that when used in this specification and the appended claims of this application, the terms "comprise" and indicate the presence of described features, wholes, steps, operations, elements and/or components, but do not exclude the presence or addition of one or more other features, wholes, steps, operations, elements, components and/or a set thereof.

It is to be understood that a term "and/or" used in this specification of this application and the appended claims refers to one or more of any and all possible combinations of the associated items that is listed and includes the combinations.

As used in this specification and the appended claims of this application, the term "if" may be interpreted as "when" or "once" or "in response to determining" or "in response to detecting" according to the context. Similarly, the phrase "if determining" or "if detecting [described condition or event]" may be interpreted as "once determining" or "in response to determining" or "once detecting [described condition or event]" or "in response to detecting [described condition or event]" according to the context.

In addition, in the descriptions of this specification and appended claims of this application, the terms such as "first", "second", and "third" are used only to distinguish descriptions, and should not be understood as indicating or implying relative importance.

The reference terms such as "an embodiment" or "some embodiments" described in this specification of this application means that particular features, structures, or characteristics described with reference to the embodiment or embodiments may be included in one or more embodiments of this application. Therefore, phrases "in an embodiment," "in some embodiments," "in other embodiments," "in some other embodiments," and the like in different parts of this specification do not necessarily refer to the same embodiment, but means "one or more but not all embodiments", unless specifically emphasized otherwise. The terms "include", "comprise", "have", and variants thereof mean "including but not limited to" unless specifically emphasized otherwise.

Figure 1:
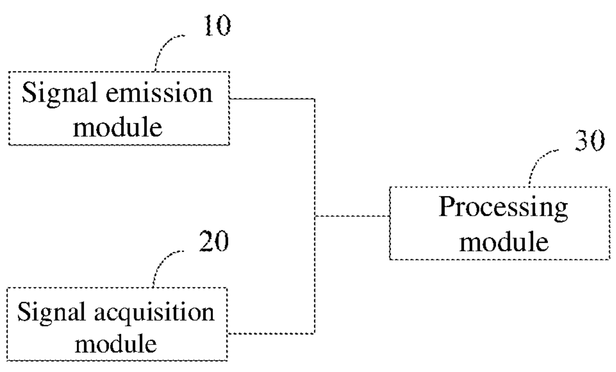
FIG. 1 is a schematic structural diagram of a time-of-flight based depth calculation system, according to an embodiment of this application.

FIG. 1 is a schematic structural diagram of a time-of-flight based depth calculation system, according to this application. The system includes:

- a signal emission module 10, configured to emit light beam, e.g., an infrared beam to a target region;
- a signal acquisition module 20, including at least one tap, configured to acquire charge signals of reflected signals reflected by the target region at different times, to form a phase image based on the charge signals; and
- a processing module 30, configured to obtain a differential ratio of the charge signals at different times based on the phase image, and calculate a corresponding phase based on a relationship between the differential ratio of the charge signals and a preset threshold, to calculate a depth value of the target region by using the phase.

In some embodiments, the signal emission module 10 includes a light emitter/source. The light source may be a light emitting diode (LED), an edge emitting laser (EEL), a vertical cavity surface emitting laser (VCSEL), or the like, or may be a light source array including a plurality of light sources. A beam emitted by the light source may alternatively be visible light, ultraviolet light, or the like, in addition to infrared light. In some embodiments, power supplies may be stable direct-current power supplies. Under the control of stable direct-current power supplies with different power, the light source emits, at a certain frequency, infrared beams with different intensity. The infrared beams may be used for an indirect time-of-flight (Indirect-TOF) measurement method. The frequency is set based on a measured distance. For example, the frequency may be set to range from 1 MHz to 100 MHz and the measured distance ranges from several meters to several hundred meters. Through amplitude modulation, the beams emitted by the light source may be modulated into pulsed beams, square wave beams, sine wave beams, and the like, which are not limited herein.

In some embodiments, the signal acquisition module 20 may be an image sensor including a charge-coupled device (CCD), a complementary metal oxide semiconductor (CMOS), an avalanche diode (AD), a single-photon avalanche diode (SPAD), and the like. Generally, the image sensor is further connected to a readout circuit including one or more of devices such as a signal amplifier, a time-to-digital converter (TDC), and an analog-to-digital converter (ADC).

In some embodiments, the processing module 30 may be further configured to control the signal emission module 10 to emit emitted signals, and the emitted signals may be infrared beams. The signal acquisition module 20 is configured to receive emitted signals, and the emitted signals may be emitted beams.

In some embodiments, the signal acquisition module 20 may be a TOF image sensor including at least one pixel. Compared with a conventional image sensor configured only to take pictures, the TOF image sensor of this application may include 4 or more taps (configured to, under the control of a corresponding electrode, store and read or discharge a charge signal generated by a reflected light pulse) in each pixel. Each tap is switched in a certain order in a single frame period T (or in a single exposure time) to acquire a charge signal generated when the pixel receives the reflected light pulse. It should be noted that, a quantity of taps included in each pixel may be designed based on an actual situation, and each pixel may also include only one tap, as long as the tap acquires the charge signal in a time sequence. The quantity of taps is not limited herein.

A time-of-flight based depth calculation method according to an embodiment of this application is described in detail below with reference to FIG. 1.

Figure 2:
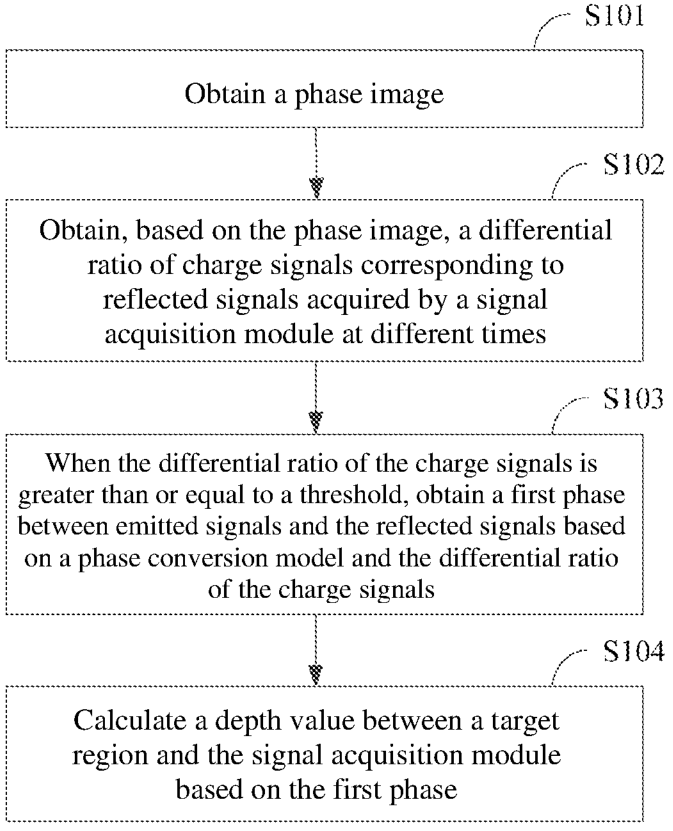
FIG. 2 is a flowchart of a time-of-flight based depth calculation method, according to an embodiment of this application.

FIG. 2 is a flowchart of time-of-flight based depth calculation method according to this application. Referring to FIG. 2, the method is described in detail below:

S101. Obtain a phase image, where the phase image is generated based on reflected signals that are reflected by a target region and acquired by a signal acquisition module in a single frame period.

In some embodiments, the signal acquisition module may acquire reflected signals reflected by a target object in a preset time sequence within the signal frame period or a single exposure time. The reflected signals can generate charge signals, and the taps acquire the reflected signals in the same time sequence. The signal frame period refers to a time for obtaining one frame of image, and the preset time sequence refers to a preset time and sequence. When the emitted signals are infrared beams, the reflected signals may be reflected beams.

The taps on pixels of the signal acquisition module may acquire electrons generated when the pixels receive reflected infrared light in a certain time sequence within the signal frame period T (or the single exposure time), convert the electrons into charge signals, and convert the charge signals into grayscale values and then store the grayscale values into corresponding pixels. The grayscale values stored in all pixels on the signal acquisition module are integrated into one image, that is, the phase image. It should be noted that, the grayscale values stored in the pixels represent signal strength of reflected light; and one pixel may store a plurality of grayscale values to represent electron numbers acquired by a plurality of taps at different times.

S102. Obtain, based on the phase image, a differential ratio of charge signals corresponding to the reflected signals acquired by the signal acquisition module at different times.

The charge signals corresponding to the reflected signals acquired by the taps in the signal acquisition module at different times may be obtained based on the phase image. The differential ratio is calculated based on the charge signals.

Figures 3, 4, 5:
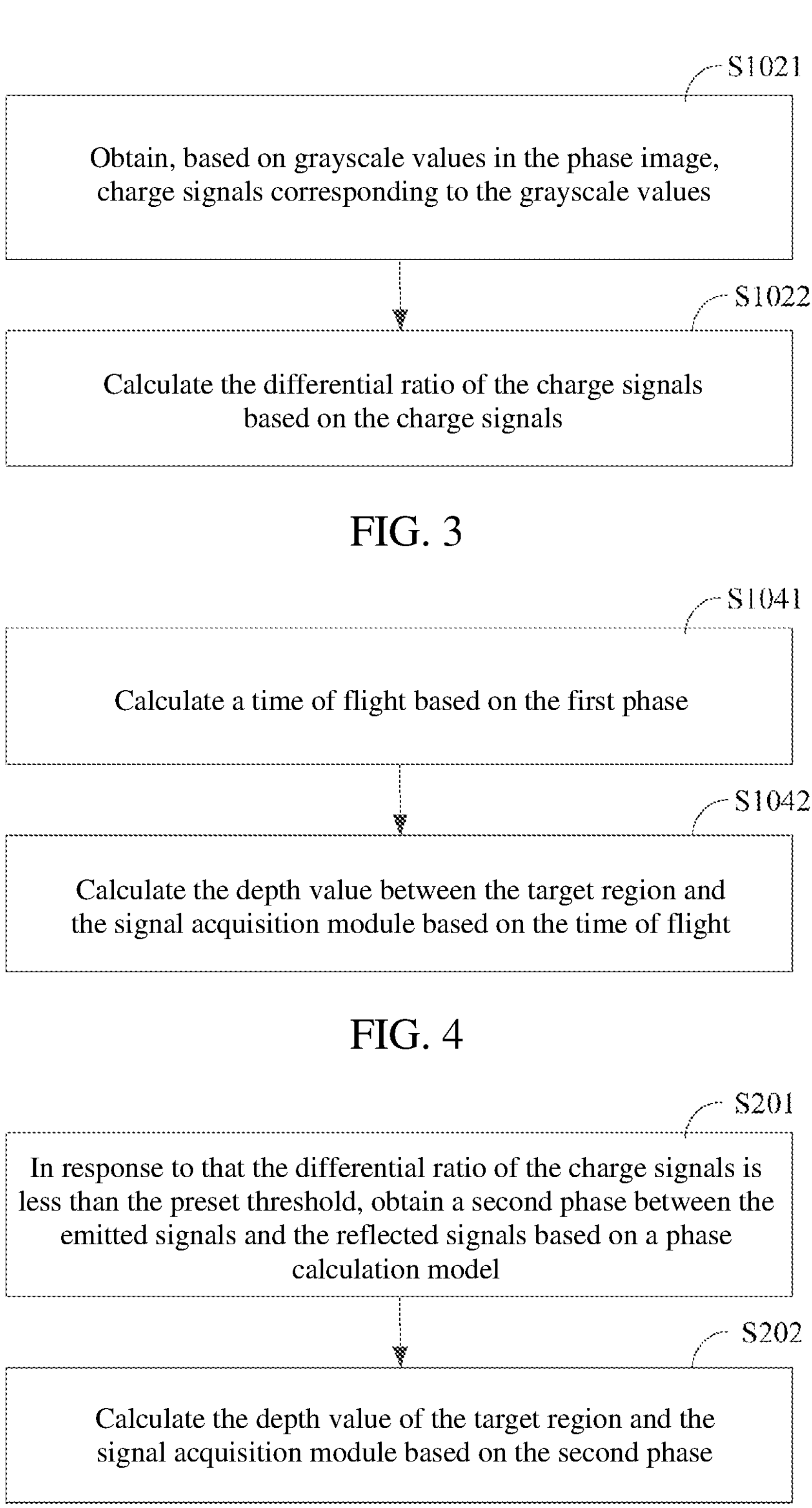
FIG. 3 is a flowchart of a calculation method for obtaining a differential ratio of charge signals, according to an embodiment of this application.
FIG. 4 is a flowchart of a calculation method for obtaining a depth value, according to an embodiment of this application.
FIG. 5 is a flowchart of a calculation method for obtaining a depth value, according to another embodiment of this application.

As shown in FIG. 3, in an embodiment, an implementation process of step S102 may include:

S1021. Obtain, based on grayscale values in the phase image, charge signals corresponding to the grayscale values.

In some embodiments, the charge signals (e.g., electron numbers) may be calculated based on the grayscale values, a bias of the signal acquisition module, and a gain used during signal acquisition. The charge signals may be based on an electron number calculation model $Q=(ADU-m)\times G$, where Q is the charge signals, ADU is the grayscale values, m is the bias of the signal acquisition module, and G is the gain.

It should be noted that, one grayscale value may represent one electron number, one pixel may include one or more taps, one tap corresponds to one grayscale value, and a plurality of taps correspond to a plurality of grayscale values, that is, one pixel may include a plurality of gray scale values.

S1022. Calculate the differential ratio of the charge signals acquired by taps at different times based on the charge signals.

Based on the indirect time-of-flight (Indirect-TOF) measurement method, when the emitted signals are sine wave signals or square wave signals, phase delays between the emitted signals and the reflected signals may be obtained based on demodulation signals of four phases. Phase differences between the demodulation signals of four phases are 90 degrees. If each pixel corresponds to four taps, and the reflected signals detected by the four taps are continuous waves with a 50% duty cycle, the delays of the reflected signals detected by the four taps relative to the emitted signals are 0°, 90°, 180°, and 270°. Sampling is performed at phases 0°, 90°, 180°, and 270° of the reflected signals. In this application, a sampling point 0° is recorded as a first phase sampling point, a sampling point 90° is recorded as a second phase sampling point, a sampling point 180° is recorded as a third phase sampling point, and a sampling point 270° is recorded as a fourth phase sampling point. The differential ratio of the charge signals obtained based on a differential ratio calculation model includes:

$$A = \frac{Q_2 - Q_4}{Q_3 - Q_1}$$

A is the differential ratio of the charge signals obtained by the taps at different times within the single frame period. $Q_1$ is a charge signal of a reflected signal acquired by the signal acquisition module at the first phase sampling point. $Q_2$ is a charge signal of a reflected signal acquired by the signal acquisition module at the second phase sampling point. $Q_3$ is a charge signal of a reflected signal acquired by the signal acquisition module at the third phase sampling point. $Q_4$ is a charge signal of a reflected signal acquired by the signal acquisition module at the fourth phase sampling point. The first phase sampling point, the second phase sampling point, the third phase sampling point, and the fourth phase sampling point correspond to different times within the single frame period.

S103. When the differential ratio of the charge signals is greater than or equal to a preset threshold, obtain a first phase based on a phase conversion model and the differential ratio of the charge signals.

In some embodiments, when the differential ratio of the charge signals is greater than or equal to the preset threshold, an obtained depth value of the target region is low in accuracy with a big error if a model for phase calculation in the indirect time-of-flight (Indirect-TOF) measurement method is directly used for calculating the phase. Therefore, when the differential ratio of the charge signals is greater than or equal to the preset threshold, the phase conversion model may be used to calculate a phase after certain conversion is performed on the differential ratio of the charge signals. The phase is recorded as the first phase in this application. In this way, a more accurate phase can be obtained, and the finally obtained depth value is more accurate.

In an embodiment, the phase conversion model includes:

$$\Delta\varphi_1 = \frac{\pi}{2} - \arctan\frac{1}{x} - \arctan B$$

where $\Delta\varphi_1$ is the first phase, $$x = \frac{A+B}{1-A\times B},$$

A is the differential ratio of the charge signals, and B is a preset value.

In some embodiments, when $\Delta\varphi_1$ is calculated, Taylor expansion calculation may be performed on $$\arctan\frac{1}{x}.$$

Taylor expansion performed on $$\arctan\frac{1}{x}$$

brings a high degree of fitting and can ensure the accuracy of $\Delta\varphi_1$.

In some embodiments, it is assumed that arctanx=arctan((A+B)/(1−A×B))=arctan(A)+arctan(B). Therefore, arctan(A)=arctanx−arctanB. Because A is greater than the preset threshold, and x=(A+B)/(1−A×B), 1/X is certainly less than the preset threshold.

Therefore, $$\arctan x = \frac{\pi}{2} - \arctan\frac{1}{x}.$$

Therefore, $$\arctan(A) = \frac{\pi}{2} - \arctan\frac{1}{x} - \arctan B$$

can be obtained.

In some embodiments, the preset value B may be set based on actual needs.

The preset threshold may be set based on the property of an inverse trigonometric function. When a signal strength difference is greater than 0.5, accuracy is reduced by directly using a phase calculation model to calculate an inverse trigonometric function of the signal strength difference. Therefore, the preset threshold may be set to 0.5, and when the signal strength difference is less than 0.5, the accuracy of calculation can be ensured by directly using the phase calculation model to calculate the phase.

S104. Calculate a depth value of the target region based on the first phase.

In some embodiments, based on the indirect time-of-flight (Indirect-TOF) measurement method, a time of flight may be calculated after the phase is obtained, and then the depth value is calculated. The depth value represents a distance between the target region and the signal acquisition module.

As shown in FIG. 4, an implementation process of step S104 may include:

- S1041. Calculate a time of flight based on the first phase, where the time of flight represents a time period between a first time when a signal emission module emits emitted signals and a second time when the signal acquisition module acquires the emitted signals.

In some embodiments, the time of flight may be obtained based on a TOF calculation model $$\Delta t = \frac{\Delta\varphi}{2\pi f_m},$$

where Δt is the time of flight, and Δφ is the phase. When the differential ratio of the charge signals is greater than or equal to the preset threshold, $\Delta\varphi=\Delta\varphi_1$ as the first phase, and $f_m$ is a modulation frequency of the signal acquisition module.

S1042. Calculate the depth value of the target region based on the time of flight.

In some embodiments, the depth value may be obtained based on a depth calculation model $$d = \frac{c \times \Delta t}{2},$$

where d is the depth value, c is the speed of light in a vacuum, and Δt is the time of flight.

In some embodiments, if a distance between optical centers of the signal emission module and the signal acquisition module is less than a preset value, and optical axes between the two modules are parallel to each other, the distance may be calculated directly based on the depth calculation model. Otherwise, the signal acquisition module and the signal emission module need to be calibrated, to obtain internal and external parameters of the signal acquisition module, and then the depth value is calculated by using the internal and external parameters and the depth calculation model.

In some embodiments of this application, the phase image formed by the reflected beams that are reflected by the target region and acquired by the signal acquisition module within the single frame period is obtained; and based on the phase image, the charge signal of each tap is obtained and the differential ratio of the charge signals is calculated. When the differential ratio of the charge signals is greater than or equal to the preset threshold, the first phase is obtained based on the phase conversion model and the differential ratio of the charge signals; and the depth value of the target region is calculated based on the first phase. In this application, when the differential ratio of the charge signals is greater than or equal to the preset threshold, the phase conversion model is adopted to calculate the first phase. In this way, the obtained depth value of the target region can be ensured to be more accurate. The calculation is simpler and the calculation efficiency is higher in this application than in existing technologies.

As shown in FIG. 5, in an implementation, after step S104, the foregoing method may further include:

- S201. When the differential ratio of the charge signals is less than the preset threshold, obtain a second phase based on a phase calculation model. The phase calculation model includes $\Delta\varphi_2$ arctanA, where $\Delta\varphi_2$ is the second phase, and A is the differential ratio of the charge signals.

In some embodiments, when the differential ratio of the charge signals is less than the preset threshold, the phase calculation model may be directly used to calculate the phase. The phase is recorded as the second phase in this application.

S202. Calculate the depth value of the target region based on the second phase.

In some embodiments, a method for calculating the depth value based on the second phase is the same as the foregoing method for calculating the depth value based on the first phase. For details, reference may be made to the foregoing method for calculating the depth value based on the first phase, which is not described herein again.

In an implementation, if the first phase is a floating-point phase, after step S103, the foregoing method may further include:

S301. Convert the first phase into a fixed-point phase to obtain a third phase.

In some embodiments, floating-point data has a heavy calculation burden and a slower calculation speed compared with fixed-point data. Therefore, when the first phase is a floating-point phase, the floating-point phase may be first converted into the fixed-point phase and then calculation is performed, thereby improving the calculation efficiency.

In some embodiments, after the third phase is obtained, the time of flight may be calculated based on the third phase, and then the depth value of the target region is calculated.

An implementation method of step S301 may include:

S3011. Determine a first bit number of the fixed-point phase based on the accuracy of the first phase.

In some embodiments, a quantity of fixed points required when the floating-point phase is represented by using the quantity of the fixed points may be determined based on the accuracy of the first phase, that is, the accuracy of the floating-point phase. A bit number of the fixed-point phase is determined based on the quantity of the fixed points. The bit number is recorded as the first bit number in this application.

As an example, if the accuracy of the first phase is 0.000001, 1,000,000 fixed points are required to represent the accuracy of the floating-point phase when the first phase is converted into the fixed-point phase, and a dynamic range is 0 to 1,000,000. Therefore, the bit number of the fixed-point phase is 20 and represented as 20 bits. If the accuracy of the first phase is 0.001, 1,000 fixed points are required to represent the accuracy of the floating-point phase when the first phase is converted into the fixed-point phase, and a dynamic range is 0 to 1,000. Therefore, the bit number of the fixed-point phase is 10 and represented as 10 bits.

S3012. Based on the first bit number of the fixed-point phase, obtain the third phase.

In some embodiments, the third phase may be obtained based on a phase conversion model $\Delta\theta=\text{round}(\Delta\varphi_1\times 2^n)$, where $\Delta\theta$ is the third phase, round ( ) means rounding a number, $\Delta\varphi_1$ is the first phase, and n is the first bit number of the fixed-point phase.

In some embodiments, the third phase is substituted into the TOF calculation model $$\Delta t=\frac{\Delta\varphi}{2\pi f_m}$$

to obtain the time of flight $$\Delta t=\frac{\Delta\theta}{2\pi f_m}=\frac{\Delta\varphi_1}{2^{n+1}\pi f_m}.$$

In some embodiments of this application, the floating-point phase is converted into the fixed-point phase, and the depth value of the target region is calculated by using the fixed-point phase. In this way, the accuracy of the initial floating-point phase is maintained, and the calculation efficiency is also increased, so that this application, can be applied to devices with a low calculation capability, such as an embedded device.

In an implementation, if the second phase is a floating-point phase, after step S201, the foregoing method may further include:

converting the second phase into a fixed-point phase to obtain a fourth phase; and calculating the depth value of the target region based on the fourth phase.

In some embodiments, a method for converting the second phase into the fourth phase is the same as the method for converting the first phase into the third phase in step S301. For details, refer to descriptions in step S301, which are not described herein again.

In an implementation, in order to verify the accuracy of the depth value of the target region calculated when the differential ratio of the charge signals is greater than or equal to the preset threshold, after step S104, the foregoing method may further include:

determining, based on the depth value of the target region and an accurate distance, whether the depth value of the target region meets requirements.

In some embodiments, a difference between the depth value of the target region and the accurate distance is calculated. If the difference is within a preset range, it is determined that the depth value of the target region meets the requirements; otherwise, the depth value of the target region does not meet the requirements.

In some embodiments of this application, the accuracy of the foregoing method may be determined by verifying whether the depth value of the target region meets the requirements.

It should be noted that, a more accurate depth value between the target region and the signal acquisition module can also be obtained by continuously obtaining a plurality of frames of phase images, and calculating an average value of a plurality of depth values through several times of solving.

It should be understood that the order of the sequence numbers of the steps in the foregoing embodiments does not mean the order of execution, and the execution order of each process is determined by its function and inherent logic, and does not constitute any limitation on the implementation process of the embodiments of this application.

Figure 6:
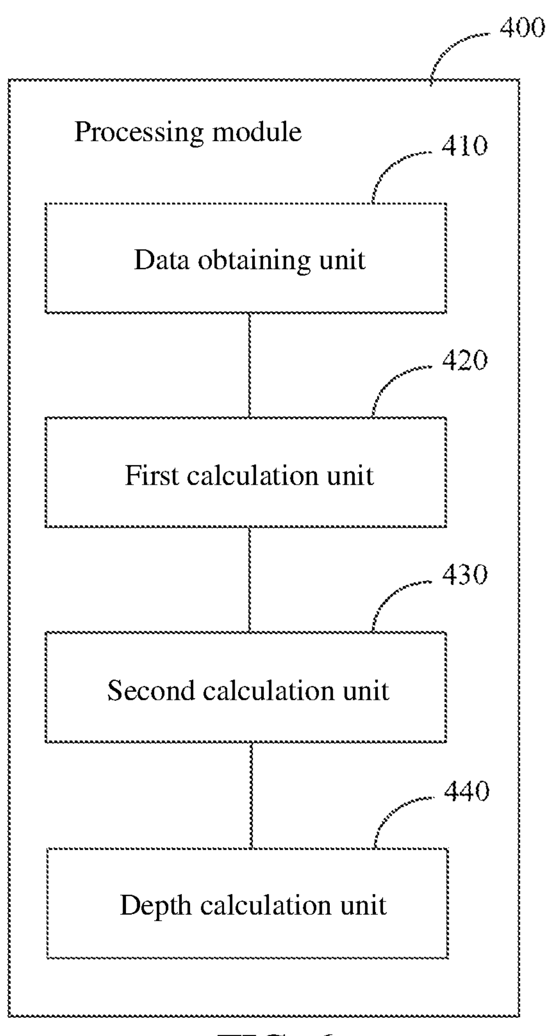
FIG. 6 is a schematic structural diagram of a processing module, according to an embodiment of this application.

Referring to FIG. 6, the processing module 400 may include: a data obtaining unit 410, a first calculation unit 420, a second calculation unit 430, and a depth calculation unit 440.

The data obtaining unit 410 is configured to obtain a phase image, where the phase image is generated based on reflected signals that are reflected by a target region and acquired by a signal acquisition module in a single frame period.

The first calculation unit 420 is configured to obtain, based on the phase image, a differential ratio of charge signals corresponding to the reflected signals acquired by the signal acquisition module at different times.

The second calculation unit 430 is configured to, when the differential ratio of the charge signals is greater than or equal to a preset threshold, obtain a first phase based on a phase conversion model and the differential ratio of the charge signals.

The depth calculation unit 440 is configured to calculate a depth value of the target region based on the first phase. In an implementation, the phase conversion model includes:

$$\Delta\varphi_1=\frac{\pi}{2}-\arctan\frac{1}{x}-\arctan B$$

where $\Delta\varphi_1$ is the first phase, $$x = \frac{A + B}{1 - A \times B},$$

A is the differential ratio of the charge signals, and B is a preset value.

In an implementation, the first calculation unit 420 further includes:

a third calculation unit, configured to, when the differential ratio of the charge signals is less than the preset threshold, obtain a second phase between the emitted signals and the reflected signals based on a phase calculation model, where the phase calculation model includes $\Delta\varphi_2$ arctanA, $\Delta\varphi_2$ is the second phase, and A is the differential ratio of the charge signals; and calculate the depth value of the target region based on the second phase.

In an implementation, the first calculation unit 420 may be configured to:

obtain, based on grayscale values in the phase image, charge signals corresponding to the grayscale values; and calculate the differential ratio of the charge signals based on the charge signals.

In an implementation, the first calculation unit 420 may be configured to:

calculate the differential ratio of the charge signals based on a differential ratio calculation model $$A = \frac{Q_2 - Q_4}{Q_3 - Q_1},$$

where A is the differential ratio of the charge signals, $Q_1$ is a charge signal of a reflected signal acquired by the signal acquisition module at a first phase sampling point, $Q_2$ is a charge signal of a reflected signal acquired by the signal acquisition module at a second phase sampling point, $Q_3$ is a charge signal of a reflected signal acquired by the signal acquisition module at a third phase sampling point, $Q_4$ is a charge signal of a reflected signal acquired by the signal acquisition module at a fourth phase sampling point, and the first phase sampling point, the second phase sampling point, the third phase sampling point, and the fourth phase sampling point correspond to different times within the single frame period.

In an implementation, the depth calculation unit 440 may be configured to:

calculate a time of flight based on the first phase, where the time of flight represents a time period between a first time when a signal emission module emits emitted signals and a second time when the signal acquisition module acquires the emitted signals; and calculate the depth value of the target region based on the time of flight.

In an implementation, the first phase is a floating-point phase and the second calculation unit 430 is further configured to:

convert the first phase into a fixed-point phase to obtain a third phase. Correspondingly, the depth calculation unit 440 may be configured to:

calculate the depth value of the target region based on the third phase.

It should be noted that, since content such as information exchange between and an execution process of modules/units of the foregoing apparatus belongs to the same idea as the method embodiment of this application, specific functions and technical effects may specifically refer to the method embodiment. Details are not described herein again.

A person skilled in the art may clearly understand that, for the purpose of convenient and brief description, only division of the foregoing functional units or module are used as an example for description. In a practical application, the functions may be allocated to and completed by different functional units or modules according to requirements. That is, an internal structure of the apparatus is divided into different functional units or modules to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software function unit. In addition, the specific names of each functional unit and module are only for the purpose of distinguishing each other, and are not used to limit the protection scope of this application. For specific work processes of the units and modules in the system, reference may be made to corresponding processes in the foregoing method embodiments, and details are not described herein again.

Figure 7:
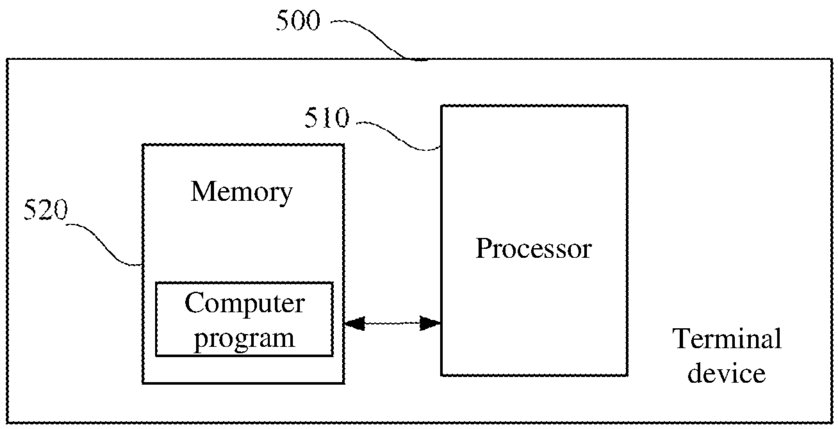
FIG. 7 is a schematic structural diagram of a terminal device, according to an embodiment of this application.

An embodiment of this application further provides a terminal device. As shown in FIG. 7, the terminal device 500 may include: at least one processor 510, a memory 520, and a computer program stored in the memory 520 and executable on the at least one processor 510. The processor 510, when executing the computer program, implements steps in any one of the foregoing method embodiments, for example, steps S101 to S104 in the embodiment shown in FIG. 2. Alternatively, the processor 510, when executing the computer program, implements functions of the modules/units in the foregoing apparatus embodiments, for example, functions of the modules 410 to 440 shown in FIG. 6.

Exemplarily, the computer program may be split into one or more modules/units that are stored in the memory 520 and executed by the processor 510 to implement this application. The one or more modules/units may be a series of computer program segments that can implement specified functions. The computer program segments are used for describing an execution process of the computer program in the terminal device 500.

A person skilled in the art may understand that FIG. 7 is merely an example of the terminal device, and does not constitute a limitation to the terminal device. The terminal device may include more or fewer components than those shown in the figure, or some components may be combined, or different components, such as an input/output device, a network access device, and a bus may be used.

The processor 510 may be a central processing unit (CPU), or may be another general purpose processor, a digital signal processor (DSP), an application-specific integrated circuit (ASIC), a field programmable gate array (FPGA) or another programmable logic device, a discrete gate, a transistor logic device, a discrete hardware component, or the like. The general purpose processor may be a microprocessor, or the processor may be any conventional processor.

The memory 520 may be an internal storage unit of the terminal device, or may be an external storage device of the terminal device, such as a plug-in hard disk, a smart media card (SMC), a secure digital (SD) card, or a flashcard. The memory 520 is configured to store the computer program and other programs and data that are required by the terminal device. The memory 520 may be further configured to temporarily store data that has been outputted or data to be outputted.

The bus may be an industry standard architecture (ISA) bus, a peripheral component interconnect (PCI) bus, an extended industry standard architecture (EISA) bus, or the like. The bus may be classified into an address bus, a data bus, a control bus, or the like. For ease of representation, the bus in the accompanying drawings of this application is not limited to only one bus or only one type of bus.

The distance measurement method provided in the embodiments of this application may be applied to a terminal device, such as a computer, a tablet computer, a notebook computer, a netbook, or a personal digital assistant (PDA). A specific type of the terminal device is not limited in the embodiments of this application.

An embodiment of this application further provides a computer-readable storage medium, storing a computer program, where the computer program, when executed by a processor, may implement the steps in the embodiments of the foregoing distance measurement method.

An embodiment of this application provides a computer program product, where the computer program product, when run on a mobile terminal, causes the mobile terminal to implement the steps in the embodiments of the foregoing distance measurement method.

When the integrated unit is implemented in the form of a software functional unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some intermediate forms, or the like. The non-transitory computer-readable storage medium may at least include: any entity or apparatus that can carry a computer program code to a photographing apparatus/terminal device, a recording medium, a computer memory, a read-only memory (ROM), a random access memory (RAM), an electric carrier signal, a telecommunication signal, a software distribution medium, or the like, for example, a USB flash drive, a removable hard disk, a magnetic disk, or an optical disc. In some jurisdictions, according to legislation and patent practice, the computer-readable medium may not be an electric carrier signal and a telecommunication signal.

In the embodiments, descriptions of the embodiments have different emphases. As for parts that are not described in detail in one embodiment, reference can be made to the relevant descriptions of the other embodiments.

A person of ordinary skill in the art may be aware that, in combination with the examples of units and algorithm steps described in the embodiments disclosed in this specification, this application may be implemented by using electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In the embodiments provided in this application, it is to be understood that the disclosed apparatus/network device and method may be implemented in other manners. For example, the described embodiments of the apparatus/network device are merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions of the embodiments.

The foregoing embodiments are merely intended for describing the technical solutions of this application, but not for limiting this application. Although this application is described in detail with reference to the foregoing embodiments, persons of ordinary skill in the art are to understand that they may still make modifications to the technical solutions described in the foregoing embodiments or make equivalent replacements to some technical features thereof, and such modifications or replacements may not cause the essence of corresponding technical solutions to depart from the spirit and scope of the technical solutions in the embodiments of this application.

What is claimed is:

1. A time-of-flight depth calculation method, comprising:

obtaining a phase image, wherein the phase image is generated based on reflected signals from a target region acquired by an image sensor in a single frame period;

obtaining, based on the phase image, a differential ratio of charge signals corresponding to the reflected signals acquired by the image sensor at different times;

in response to that the differential ratio of the charge signals is greater than or equal to a threshold, obtaining a first phase based on a phase conversion model and the differential ratio of the charge signals;

calculating a depth value of the target region based on the first phase;

in response to that the differential ratio of the charge signals is less than the threshold, obtaining a second phase based on a phase calculation model, wherein the phase calculation model comprises $\Delta\varphi 2=\arctan A$, $\Delta\varphi 2$ is the second phase, and A is the differential ratio of the charge signals; and calculating the depth value of the target region based on the second phase.

2. The time-of-flight depth calculation method according to claim 1, wherein the phase conversion model comprises:

$$\Delta\varphi_1 = \frac{\pi}{2} - \arctan\frac{1}{x} - \arctan B$$

wherein $\Delta\varphi_1$ is the first phase, $$x = \frac{A+B}{1-A\times B},$$

A is the differential ratio of the charge signals, and B is a preset value.

3. The time-of-flight depth calculation method according to claim 1, wherein the obtaining, based on the phase image, a differential ratio of charge signals corresponding to the reflected signals acquired by the image sensor at different times comprises:

obtaining, based on grayscale values in the phase image, charge signals corresponding to the grayscale values; and calculating the differential ratio of the charge signals based on the charge signals corresponding to the grayscale values.

4. The time-of-flight depth calculation method according to claim 3, wherein the calculating the differential ratio of the charge signals based on the charge signals corresponding to the grayscale values comprises:

calculating the differential ratio of the charge signals based on a differential ratio calculation model $$A = \frac{Q_2 - Q_4}{Q_3 - Q_1},$$

wherein A is the differential ratio of the charge signals, $Q_1$ is a charge signal of a reflected signal acquired by the image sensor at a first phase sampling point, $Q_2$ is a charge signal of a reflected signal acquired by the image sensor at a second phase sampling point, $Q_3$ is a charge signal of a reflected signal acquired by the image sensor at a third phase sampling point, $Q_4$ is a charge signal of a reflected signal acquired by the image sensor at a fourth phase sampling point, and the first phase sampling point, the second phase sampling point, the third phase sampling point, and the fourth phase sampling point correspond to different times within the single frame period.

5. The time-of-flight depth calculation method according to claim 1, wherein the calculating a depth value of the target region based on the first phase comprises:

calculating a time of flight based on the first phase, wherein the time of flight represents a time period between a first time when a signal emitter emits emitted signals and a second time when the image sensor acquires the emitted signals; and calculating the depth value of the target region based on the time of flight.

6. The time-of-flight depth calculation method according to claim 1, wherein the first phase is a floating-point phase, and after the obtaining a first phase based on a phase conversion model and the differential ratio of the charge signals, the method comprises:

converting the first phase into a fixed-point phase to obtain a third phase; and the calculating a depth value of the target region based on the first phase comprises:

calculating the depth value of the target region based on the third phase.

7. A time-of-flight depth calculation system, comprising:

a signal emitter, configured to emit an infrared beam to a target region;

an image sensor comprising at least one tap and configured to acquire charge signals of reflected signals from the target region at different times, to form a phase image based on the charge signals; and a processor, configured to calculate a depth value of the target region by operations comprising:

obtaining, based on the phase image, a differential ratio of the charge signals acquired by the image sensor at the different times;

determining whether the differential ratio of the charge signals is greater than or equal to a threshold;

in response to that the differential ratio of the charge signals is greater than or equal to the threshold, obtaining a first phase based on a phase conversion model and the differential ratio of the charge signals;

calculating the depth value of the target region based on the first phase;

in response to that the differential ratio of the charge signals is less than the threshold, obtaining a second phase based on a phase calculation model, wherein the phase calculation model comprises $\Delta\varphi 2=\arctan A$, $\Delta\varphi 2$ is the second phase, and A is the differential ratio of the charge signals; and calculating the depth value of the target region based on the second phase.

8. The time-of-flight depth calculation system according to claim 7, wherein the phase conversion model comprises:

$$\Delta\varphi_1 = \frac{\pi}{2} - \arctan\frac{1}{x} - \arctan B$$

wherein $\Delta\varphi_1$ is the first phase, $$x = \frac{A+B}{1-A\times B},$$

A is the differential ratio of the charge signals, and B is a preset value.

9. The time-of-flight depth calculation system according to claim 7, wherein the obtaining, based on the phase image, a differential ratio of charge signals corresponding to the reflected signals acquired by the image sensor at different times comprises:

obtaining, based on grayscale values in the phase image, charge signals corresponding to the grayscale values; and calculating the differential ratio of the charge signals based on the charge signals corresponding to the grayscale values.

10. The time-of-flight depth calculation system according to claim 9, wherein the calculating the differential ratio of the charge signals based on the charge signals corresponding to the grayscale values comprises:

calculating the differential ratio of the charge signals based on a differential ratio calculation model $$A = \frac{Q_2 - Q_4}{Q_3 - Q_1},$$

wherein A is the differential ratio of the charge signals, $Q_1$ is a charge signal of a reflected signal acquired by the image sensor at a first phase sampling point, $Q_2$ is a charge signal of a reflected signal acquired by the image sensor at a second phase sampling point, $Q_3$ is a charge signal of a reflected signal acquired by the image sensor at a third phase sampling point, $Q_4$ is a charge signal of a reflected signal acquired by the image sensor at a fourth phase sampling point, and the first phase sampling point, the second phase sampling point, the third phase sampling point, and the fourth phase sampling point correspond to different times within single frame period.

11. The time-of-flight depth calculation system according to claim 7, wherein the calculating a depth value of the target region based on the first phase comprises:

calculating a time of flight based on the first phase, wherein the time of flight represents a time period between a first time when the signal emitter emits emitted signals and a second time when the image sensor acquires the emitted signals; and calculating the depth value of the target region based on the time of flight.

12. The time-of-flight depth calculation system according to claim 7, wherein the first phase is a floating-point phase, and after the obtaining a first phase based on a phase conversion model and the differential ratio of the charge signals, the operations comprise:

converting the first phase into a fixed-point phase to obtain a third phase; and the calculating a depth value of the target region based on the first phase comprises:

calculating the depth value of the target region based on the third phase.

13. A non-transitory computer-readable storage medium, storing a computer program, wherein the computer program, when executed by a processor, causes the processor to perform operations comprising:

obtaining a phase image, wherein the phase image is generated based on reflected signals from a target region acquired by an image sensor in a single frame period;

obtaining, based on the phase image, a differential ratio of charge signals corresponding to the reflected signals acquired by the image sensor at different times;

in response to that the differential ratio of the charge signals is greater than or equal to a threshold, obtaining a first phase based on a phase conversion model and the differential ratio of the charge signals;

calculating a depth value of the target region based on the first phase;

in response to that the differential ratio of the charge signals is less than the threshold, obtaining a second phase based on a phase calculation model, wherein the phase calculation model comprises $\Delta\varphi 2=\arctan A$, $\Delta\varphi 2$ is the second phase, and A is the differential ratio of the charge signals; and calculating the depth value of the target region based on the second phase.

14. The non-transitory computer-readable storage medium according to claim 13, wherein the phase conversion model comprises:

$$\Delta\varphi_1 = \frac{\pi}{2} - \arctan\frac{1}{x} - \arctan B$$

wherein $\Delta\varphi_1$ is the first phase, $$x = \frac{A+B}{1-A\times B},$$

A is the differential ratio of the charge signals, and B is a preset value.

15. The non-transitory computer-readable storage medium according to claim 13, wherein the obtaining, based on the phase image, a differential ratio of charge signals corresponding to the reflected signals acquired by the image sensor at different times comprises:

obtaining, based on grayscale values in the phase image, charge signals corresponding to the grayscale values; and calculating the differential ratio of the charge signals based on the charge signals corresponding to the grayscale values.

16. The non-transitory computer-readable storage medium according to claim 15, wherein the calculating the differential ratio of the charge signals based on the charge signals corresponding to the grayscale values comprises:

calculating the differential ratio of the charge signals based on a differential ratio calculation model $$A = \frac{Q_2 - Q_4}{Q_3 - Q_1},$$

wherein A is the differential ratio of the charge signals, $Q_1$ is a charge signal of a reflected signal acquired by the image sensor at a first phase sampling point, $Q_2$ is a charge signal of a reflected signal acquired by the image sensor at a second phase sampling point, $Q_3$ is a charge signal of a reflected signal acquired by the image sensor at a third phase sampling point, $Q_4$ is a charge signal of a reflected signal acquired by the image sensor at a fourth phase sampling point, and the first phase sampling point, the second phase sampling point, the third phase sampling point, and the fourth phase sampling point correspond to different times within the single frame period.

17. The non-transitory computer-readable storage medium according to claim 13, wherein the calculating a depth value of the target region based on the first phase comprises:

calculating a time of flight based on the first phase, wherein the time of flight represents a time period between a first time when a signal emitter emits emitted signals and a second time when the image sensor acquires the emitted signals; and calculating the depth value of the target region based on the time of flight.

* * * * *